(12) United States Patent
Propheter-Hinckley et al.

(10) Patent No.: US 10,890,079 B2
(45) Date of Patent: Jan. 12, 2021

(54) GAS TURBINE ENGINE ARC SEGMENTS WITH ARCED WALLS

(71) Applicant: United Technologies Corporation, Farmington, CT (US)

(72) Inventors: Tracy A. Propheter-Hinckley, Rocky Hill, CT (US); Justin M. Aniello, Ellington, CT (US); Kyle J. Brevick, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/208,876

(22) Filed: Dec. 4, 2018

(65) Prior Publication Data
US 2020/0173295 A1   Jun. 4, 2020

(51) Int. Cl.
| F01D 11/00 | (2006.01) |
| F01D 11/08 | (2006.01) |
| F01D 25/24 | (2006.01) |
| F16J 15/06 | (2006.01) |
| F16J 15/08 | (2006.01) |

(52) U.S. Cl.
CPC ............ *F01D 11/005* (2013.01); *F01D 11/08* (2013.01); *F01D 25/24* (2013.01); *F16J 15/062* (2013.01); *F16J 15/0818* (2013.01); *F05D 2240/11* (2013.01); *F05D 2240/14* (2013.01); *F05D 2240/55* (2013.01)

(58) Field of Classification Search
CPC .... F01D 11/005; F01D 11/08; F05D 2204/11; F05D 2240/55; F16J 15/02; F16J 15/0818; F16J 15/04; F16J 15/062
See application file for complete search history.

(56) References Cited

U.S. PATENT DOCUMENTS

| 4,767,260 A | 8/1988 | Clevenger |
| 4,902,198 A * | 2/1990 | North ................... F01D 11/008 415/115 |
| 5,154,577 A * | 10/1992 | Kellock ................ F01D 11/005 277/641 |

(Continued)

FOREIGN PATENT DOCUMENTS

| EP | 2886800 | 6/2015 |
| EP | 2985419 | 2/2016 |

OTHER PUBLICATIONS

European Search Report for European Patent Application No. 19213670.3 completed Jan. 21, 2020.

*Primary Examiner* — Ninh H. Nguyen
(74) *Attorney, Agent, or Firm* — Carlson, Gaskey & Olds, P.C.

(57) ABSTRACT

A gas turbine engine includes first and second arc segments that each have leading and trailing sides and first and second circumferential sides. The first circumferential side includes a first slot portion and the second circumferential side includes a second slot portion. The first and second slot portions are in registration and together define a seal slot. At least the first slot portion has a first concave arced back wall. A feather seal is entrapped in the seal slot and includes first and second feather seal circumferential sides. At least the first feather seal circumferential side has a first convex arced edge that is adjacent the first concave arced back wall of the first slot portion.

18 Claims, 5 Drawing Sheets

(56) References Cited

U.S. PATENT DOCUMENTS

| | | | |
|---|---|---|---|
| 5,709,530 A | 1/1998 | Cahill | |
| 6,431,825 B1 * | 8/2002 | McLean | F01D 11/005 |
| | | | 277/644 |
| 6,503,051 B2 * | 1/2003 | Predmore | F01D 11/005 |
| | | | 277/312 |
| 6,712,581 B2 * | 3/2004 | Florjancic | B23P 13/00 |
| | | | 29/557 |
| 2007/0212214 A1 * | 9/2007 | Paauwe | F01D 9/041 |
| | | | 415/170.1 |

* cited by examiner

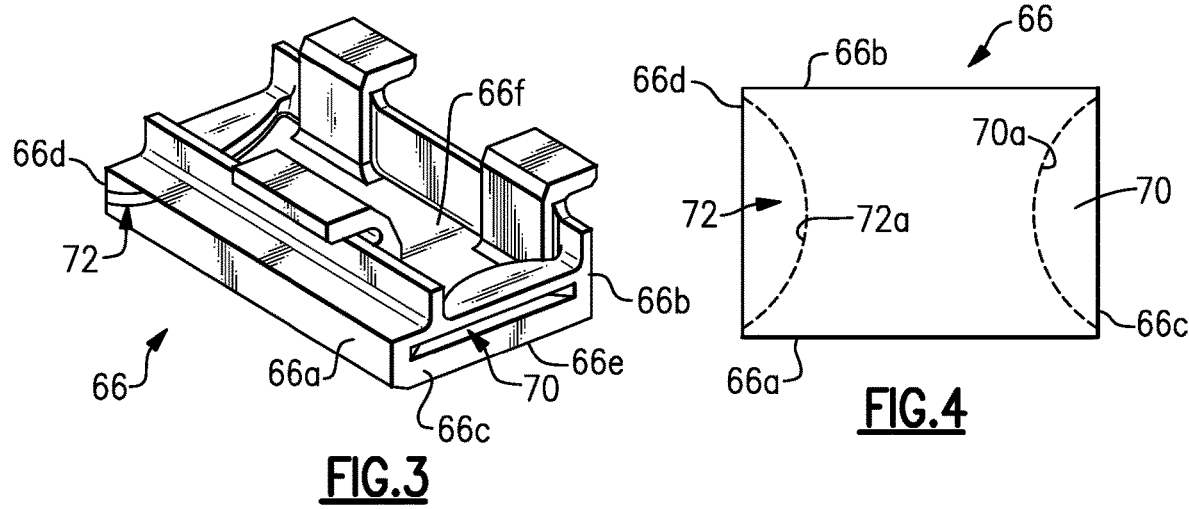
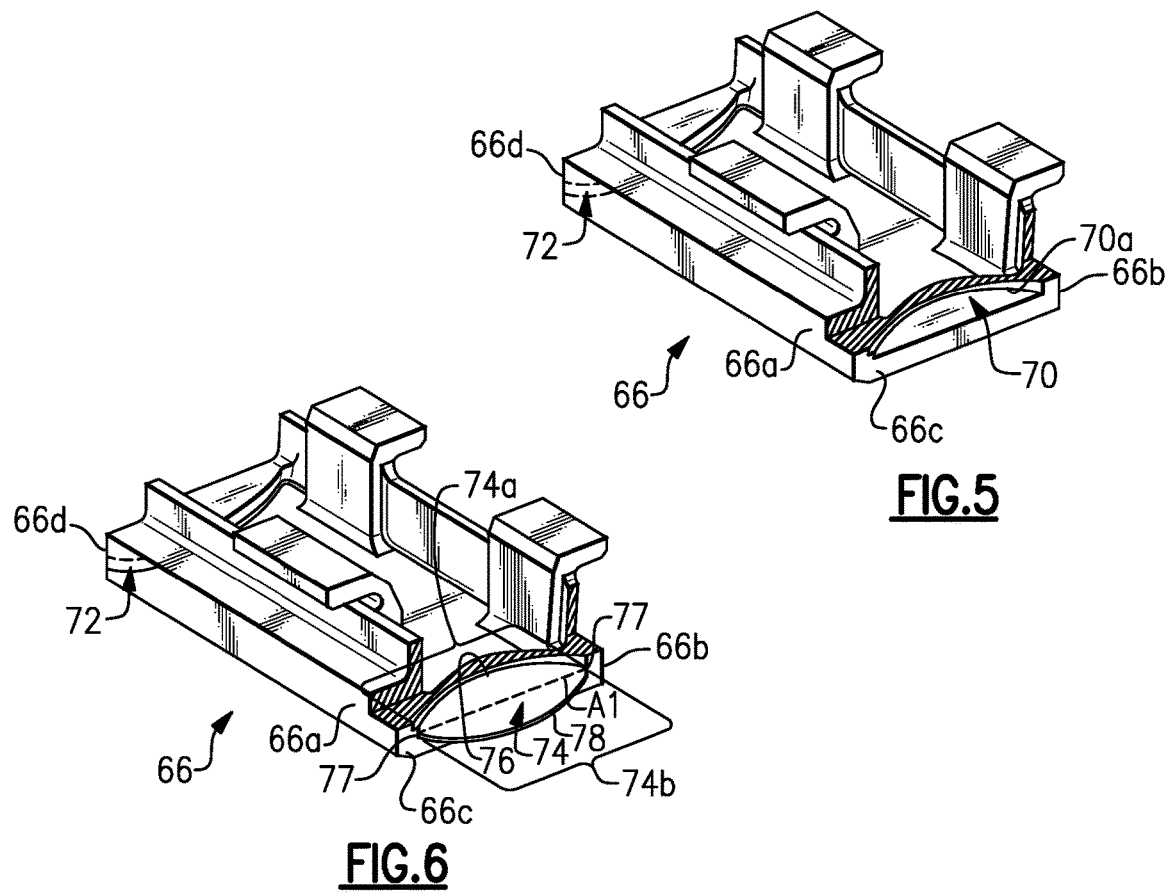

GAS TURBINE ENGINE ARC SEGMENTS WITH ARCED WALLS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine according to an example of the present disclosure includes first and second arc segments each having leading and trailing sides and first and second circumferential sides. The first circumferential side includes a first slot portion and the second circumferential side includes a second slot portion. The first and second slot portions are in registration and together define a seal slot. At least the first slot portion has a first concave arced back wall, and a feather seal entrapped in the seal slot. The feather seal has first and second feather seal circumferential sides. At least the first feather seal circumferential side has a first convex arced edge that is adjacent the first concave arced back wall of the first slot portion.

In a further embodiment of any of the foregoing embodiments, the first feather seal circumferential side is complementary in shape to the first concave arced back wall.

In a further embodiment of any of the foregoing embodiments, the second slot portion includes a second concave arced back wall, and the second feather seal circumferential side has a second convex arced edge that is adjacent the second concave arced back wall.

In a further embodiment of any of the foregoing embodiments, the first concave arced back wall includes a notch, and the first feather seal circumferential side includes a tab in the notch.

In a further embodiment of any of the foregoing embodiments, the first convex arced edge and the second convex arced edge meet at first and second apexes.

In a further embodiment of any of the foregoing embodiments, the feather seal is elongated and defines a feather seal longitudinal axis, and the feather seal is symmetric about the feather seal longitudinal axis.

In a further embodiment of any of the foregoing embodiments, the feather seal excludes any straight edges.

In a further embodiment of any of the foregoing embodiments, the first concave arced back wall includes a notch and the first feather seal circumferential side includes a tab that is in the notch.

In a further embodiment of any of the foregoing embodiments, the first concave arced back wall is semi-circular.

In a further embodiment of any of the foregoing embodiments, the first convex arced edge is semi-circular, and the first concave arced back wall and the first convex arced edge have equal radii of curvature.

An assembly method for use in a gas turbine engine according to an example of the present disclosure includes providing first and second arc segments and a feather seal. The first and second arc segments each have leading and trailing sides and first and second circumferential sides. The first circumferential side includes a first slot portion and the second circumferential side includes a second slot portion. At least the first slot portion has a concave arced back wall. The feather seal includes first and second feather seal circumferential sides. At least the first feather seal circumferential side has a convex arced edge. The first and second arc segments are brought together to entrap the feather seal in the first and second slot portions, with the convex arced edge adjacent the concave arced back wall of the first slot portion.

In a further embodiment of any of the foregoing embodiments, the first feather seal circumferential side is complementary in shape to the first concave arced back wall.

In a further embodiment of any of the foregoing embodiments, the second slot portion includes a second concave arced back wall, and the second feather seal circumferential side has a second convex arced edge that is adjacent the second concave arced back wall.

In a further embodiment of any of the foregoing embodiments, the first concave arced back wall includes a notch and the first feather seal circumferential side includes a tab, and the tab is received into the notch when the first and second arc segments are brought together.

In a further embodiment of any of the foregoing embodiments, the first concave arced back wall is semi-circular.

A seal for a gas turbine engine according to an example of the present disclosure includes a feather seal adapted for use between first and second arc segments of a gas turbine engine. The feather seal includes first and second feather seal circumferential sides. At least the first feather seal circumferential side has a convex arced edge.

In a further embodiment of any of the foregoing embodiments, the second feather seal circumferential side has a second convex arced edge.

In a further embodiment of any of the foregoing embodiments, the first feather seal circumferential side includes a tab.

In a further embodiment of any of the foregoing embodiments, the feather seal is elongated and defines a feather seal longitudinal axis, and the feather seal is symmetric about the feather seal longitudinal axis.

In a further embodiment of any of the foregoing embodiments, the feather seal excludes any straight edges.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3 illustrates an isolated view of a seal arc segment of the turbine section.

FIG. 4 illustrates a radial view of the seal arc segment.

FIG. 5 illustrates a partial cutaway view of the seal arc segment of FIG. 3.

FIG. 6 illustrates the seal arc segment of FIG. 5 with a feather seal.

FIG. 7 illustrates two adjacent seal arc segments and a feather seal entrapped there between.

DETAILED DESCRIPTION

Figure 1:
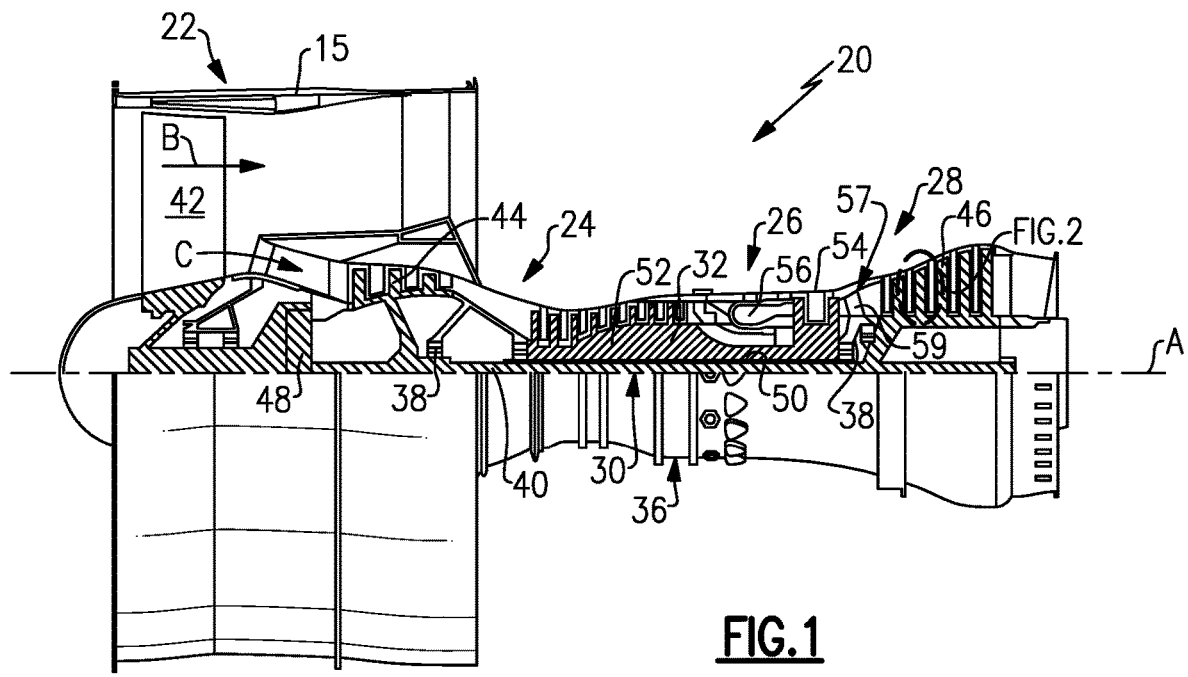
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{\wedge}0.5$. The "Low corrected fan tip speed" as disclosed herein according to one non-limiting embodiment is less than about 1150 ft/second (350.5 meters/second).

Figure 2:
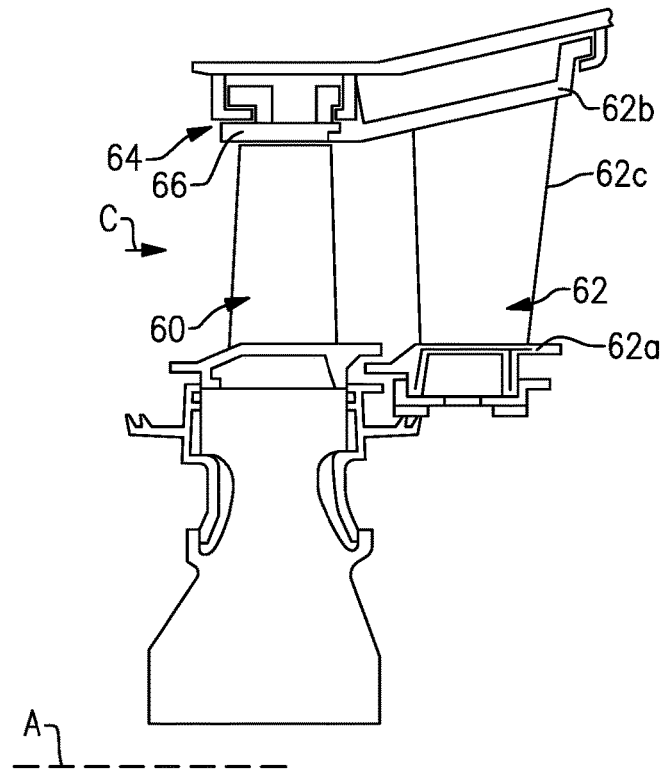
FIG. 2 illustrates a view of a turbine section of the gas turbine engine.

FIG. 2 illustrates a sectioned view through a portion of the turbine section 28 of the engine 20. The turbine section 28 includes a row of turbine blades 60 that are rotatable about the central engine axis A, followed by a downstream row of static turbine vanes 62. For example, the turbine vanes include inner and outer platforms 62a/62b and an airfoil section 62c extending there between. The platforms 62a/62b are arc segments that are circumferentially arranged in an annulus around the central axis A of the engine 20. That is, the inner platforms 62a form an inner annulus and the outer platforms 62b form an outer annulus.

A blade outer air seal 64 is located radially outwards of the blades 60. The blade outer air seal 64 includes a plurality of seal arc segments 66 that are circumferentially arranged in an annulus around the central axis A of the engine 20. The seal arc segments 66 are in close radial proximity to the tips of the blades 60, to reduce the amount of gas flow that escapes around the blades 60.

FIG. 3 illustrates a representative one of the seal arc segments 66, and FIG. 4 illustrates a radial outward view of the seal arc segment 66. The seal arc segment 66 is bound by leading and trailing sides 66a/66b and first and second circumferential sides 66c/66d. An inner side 66e faces into the core gaspath, toward the blades 60. An outer side 66f faces away from the core gaspath and blades 60. The first circumferential side 66c includes a first slot portion 70 and the second circumferential side 66d includes a second slot portion 72.

Referring also to FIG. 5, which shows a partial cutaway view of the seal arc segment 66, the first slot portion 70 extends from the first circumferential side 66c to a first concave back wall 70a. For example, the first concave back wall 70a is semi-circular such that the first slot portion 70 generally has a "D" shape. The second slot portion 72 may be similarly shaped to the first slot portion 70. The second slot portion 72 extends from the second circumferential side 66d to a second concave back wall 72a (see FIG. 4). For example, the second concave back wall 72a is also semi-circular. In a further example, the radii of curvature of the concave back walls 70a/72a are equal. It is to be appreciated, although the examples herein are described with regard to the seal arc segments 66, it is also contemplated that the examples apply to the arc segments provided by the platforms 62a/62b.

As shown in FIG. 6, a feather seal 74 is received into the first slot portion 70, which will be described in further detail below. The feather seal 74 is generally a uniform-thickness flat sheet or strip that is formed of a metallic alloy, such as a nickel- or cobalt-based alloy. The feather seal 74 includes first and second feather seal circumferential sides 74a/74b. In this example, the first feather seal circumferential side 74a has a first convex arced edge 76 and the second feather seal circumferential side 74b has a second convex arced edge 78. For instance, the arced edges 76/78 are semi-circular and have equal radii of curvatures. The arced edges 76/78 meet at apexes 77 such that the feather seal 74 is ovular or elliptical and excludes any straight edges. The apexes 77 may be points, but more typically will be rounded. In example shown, the feather seal 74 is elongated and defines a feather seal longitudinal axis A1 that intersects the apexes 77, and the feather seal 74 is symmetric about the feather seal longitudinal axis A1. As will be appreciated, a symmetric feather seal 74 would be used when the slot portions 70/72 are identical in shape. However, if the slot portions 70/72 are differently shaped, the feather seal 74 may not be symmetrical.

Figure 7:
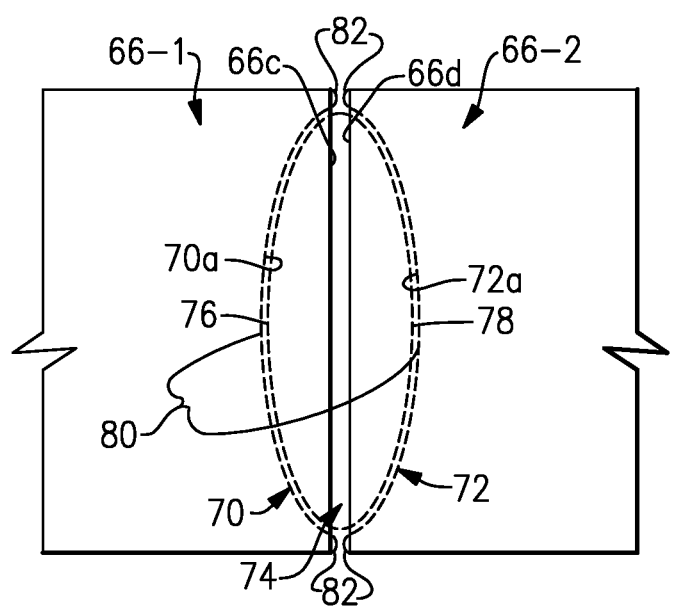

As shown in FIG. 7, when a first one of the arc segments 66-1 is arranged adjacent a second one of the seal arc segments 66-2, the first and second slot portions 70/72 are in registration and together form a seal slot 80. The feather seal 74 is entrapped in the seal slot 80 such that the first convex arced edge 76 is adjacent the first concave back wall 70a and the second convex arced edge 78 is adjacent the second concave back wall 72a. The feather seal 74 provides a labyrinth seal between the adjacent seal arc segments 66-1/66-2. As will be appreciated, there will be feather seals 74 between each adjacent pair of the seal arc segments 66. Alternatively, if used in the vanes 62, the feather seal 74 would provide a labyrinth seal between the adjacent inner platforms 62a or adjacent outer platforms 62b.

The slot portions 70/72 facilitate manufacturing of the seal arc segments 66. For instance, slots can be produced by electromagnetic discharge machining (EDM) or grinding. The EDM process can form a rectangular slot with three closed sides, to entrap the feather seal. However, the EDM process often leaves a relatively rough surface that reduces sealing performance. In comparison, grinding involves sweeping a grinding wheel across the side of the arc segment to cut the slot. The grinding produces a relatively smoother surface finish, but the resulting slot is open on three sides and thus requires welding the sides closed or implementing other features in order to retain the feather seal in the slot.

In this regard, the slot portions 70/72 represent a combination of the closed sides together with the smoother surface finish. For instance, the slot portions 70/72 are produced by grinding but without the sweeping. Instead, the grinding is conducted by moving a circular grinding wheel into the circumferential sides 66c/66d along a direction that is approximately perpendicular to the circumferential sides 66c/66d. That is, there is little or no movement of the grinding wheel back and forth along the direction between the forward and trailing sides 66a/66b. As a result, the slot portions 70/72 are cut in the shape of the grinding wheel, i.e., to a semi-circular shape. For instance, the concave back walls 70a/72a are arc segments that intersect the planes of the circumferential sides 66c/66d. The slot portions 70/72 are not cut so deep, however, that the slot portions 70/72 intersect the forward and trailing sides 66a/66b of the arc segment 66. That is, there are narrow lands 82 on the face of the sides 66c/66d between the edges of the slot portions 70/72 and the corners where the sides 66c/66d meet the forward and trailing sides 66a/66b. It is also possible that only one of the slot portions 70/72 will be ground as described above to have either the concave backs wall 70a or 70b, and that the other of the slot portions will be produced using the EDM or sweep grinding.

Figure 8:
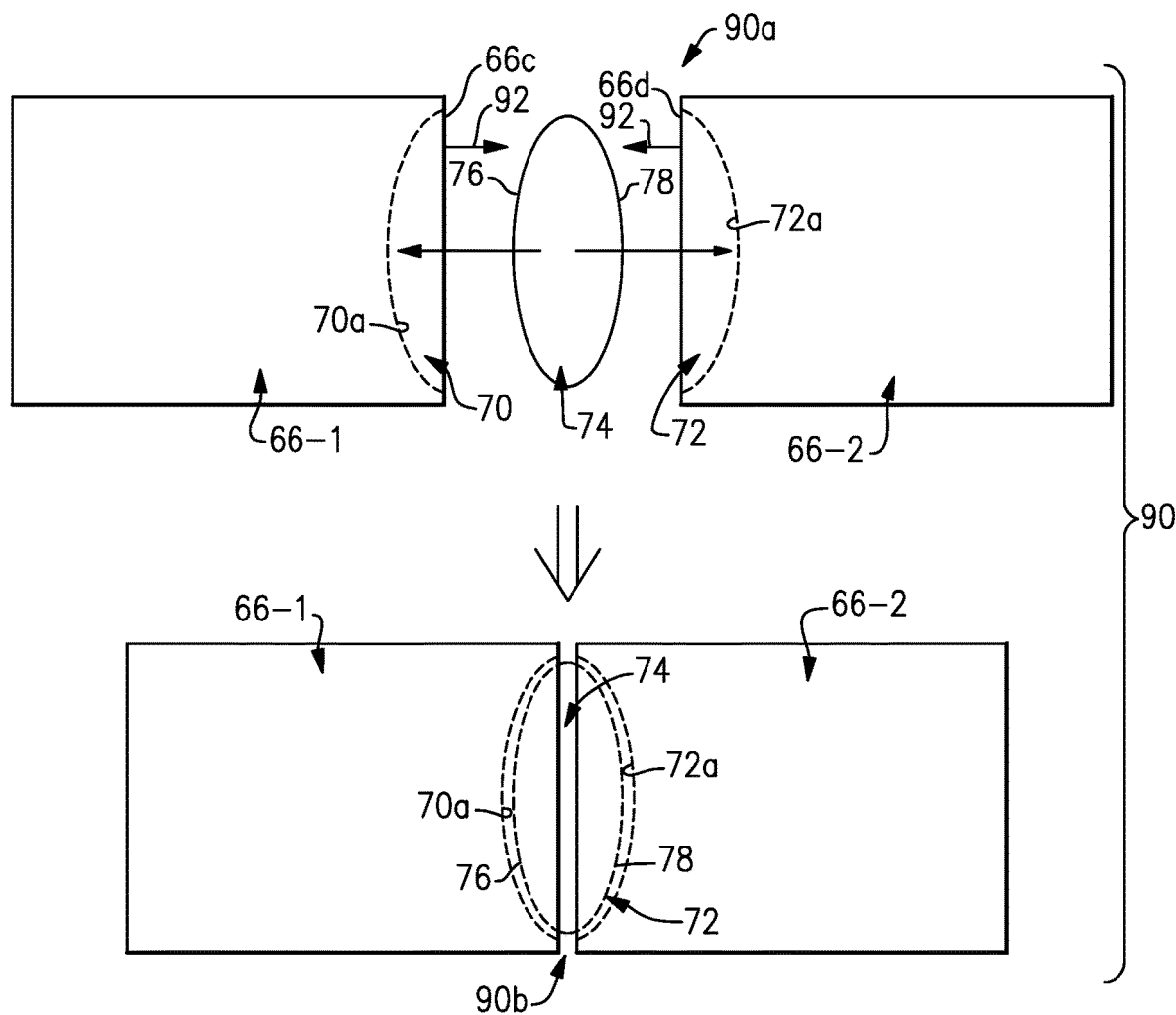
FIG. 8 illustrates a method of assembling seal arc segments and a feather seal.

FIG. 8 illustrates an example method 90 of assembling the arc segments 66-1/66-2 with the feather seal 74. Initially, as shown at 90a, the arc segments 66-1/66-2 are separated. The arc segments 66-1/66-2 are then brought together, as represented at 92. For instance, the second circumferential side 66d of the second arc segment 66-2 is moved toward the first circumferential side 66c of the first seal arc segment 66-1. The feather seal 74 may initially be inserted into the slot portion 70 (or alternatively the slot portion 72). Once the seal arc segments 66-1/66-2 are brought into close proximity, the feather seal 74 is received into the slot portion 72. As the seal arc segments 66-1/66-2 are brought into closer proximity, as shown at 90b, the feather seal 74 becomes entrapped in the slot portions 70/72.

Figure 9:
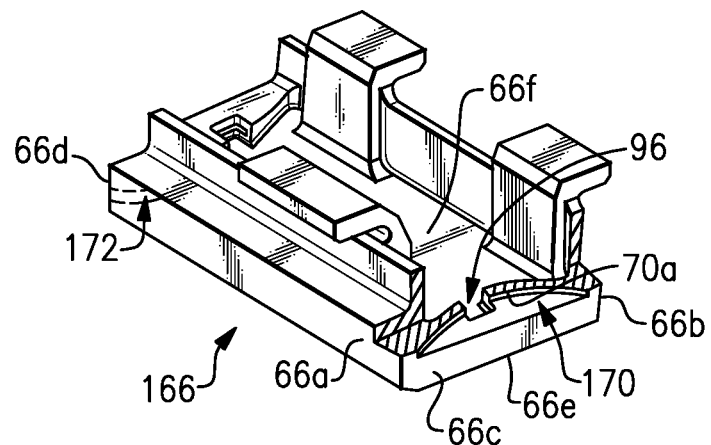
FIG. 9 illustrates another example seal arc segments with a notch.
Figure 10:
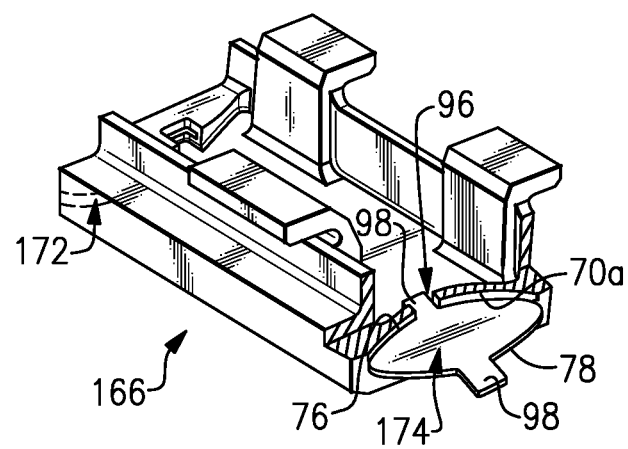
FIG. 10 illustrates the seal arc segment of FIG. 9 with a feather seal that has a tab.

FIGS. 9 and 10 illustrate another example seal arc segment 166. In this disclosure, like reference numerals designate like elements where appropriate and reference numerals with the addition of one-hundred or multiples thereof designate modified elements that are understood to incorporate the same features and benefits of the corresponding elements. In this example, the seal arc segment 166 includes a first slot portion 170 and a second slot portion 172 (which is similarly shaped to the first slot portion 170). The first slot portion 170 has the concave back wall 70a. In this example, the concave back wall 70a includes a notch 96. The notch 96 may be cast or machined. The first convex arced edge 76 of the feather seal 174 includes a tab 98. The tab 98 is received into the notch 96. The second convex arced edge 78 of the feather seal 174 may also include a tab 98 that is received into a notch 96 in the concave back wall 70a of the slot 172. The engagement of the tab or tabs 98 with the notch or notches 96 limits the feather seal 174 from moving, to maintain a proper sealing position. As will be appreciated, tabs 98 on both edges 76/78 may not be needed, and in some examples only one of the edges 76/78 may have a tab 98.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions shown schematically in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
first and second arc segments each having leading and trailing sides and first and second circumferential sides, the first circumferential side including a first slot portion and the second circumferential side including a second slot portion, the first and second slot portions being in registration and together defining a seal slot, at least the first slot portion having a first concave arced back wall; and
a feather seal entrapped in the seal slot, the feather seal including first and second feather seal circumferential sides, at least the first feather seal circumferential side having a first convex arced edge that is adjacent the first concave arced back wall of the first slot portion, wherein the first concave arced back wall includes a notch and the first feather seal circumferential side includes a tab that is in the notch.

2. The gas turbine engine as recited in claim 1, wherein the first feather seal circumferential side is complementary in shape to the first concave arced back wall.

3. The gas turbine engine as recited in claim 1, wherein the second slot portion includes a second concave arced back wall, and the second feather seal circumferential side has a second convex arced edge that is adjacent the second concave arced back wall.

4. The gas turbine engine as recited in claim 3, wherein the first convex arced edge and the second convex arced edge meet at first and second apexes.

5. The gas turbine engine as recited in claim 3, wherein the feather seal is elongated and defines a feather seal longitudinal axis, and the feather seal is symmetric about the feather seal longitudinal axis.

6. The gas turbine engine as recited in claim 1, wherein the feather seal excludes any straight edges.

7. The gas turbine engine as recited in claim 1, wherein the first concave arced back wall is semi-circular.

8. The gas turbine engine as recited in claim 7, wherein the first convex arced edge is semi-circular, and the first concave arced back wall and the first convex arced edge have equal radii of curvature.

9. An assembly method for use in a gas turbine engine, the assembly method comprising:
providing first and second arc segments and a feather seal, the first and second arc segments each have leading and trailing sides and first and second circumferential sides, the first circumferential side includes a first slot portion and the second circumferential side includes a second slot portion, at least the first slot portion has an concave arced back wall, and the feather seal includes first and second feather seal circumferential sides, at least the first feather seal circumferential side has a convex arced edge; and
bringing the first and second arc segments together to entrap the feather seal in the first and second slot portions with the convex arced edge adjacent the concave arced back wall of the first slot portion, wherein the first concave arced back wall includes a notch and the first feather seal circumferential side includes a tab, and the tab is received into the notch when the first and second arc segments are brought together.

10. The method as recited in claim 9, wherein the first feather seal circumferential side is complementary in shape to the first concave arced back wall.

11. The method as recited in claim 9, wherein the second slot portion includes a second concave arced back wall, and the second feather seal circumferential side has a second convex arced edge that is adjacent the second concave arced back wall.

12. The method as recited in claim 9, wherein the first concave arced back wall is semi-circular.

13. A seal for a gas turbine engine comprising:
a feather seal adapted for use between first and second arc segments of a gas turbine engine, the feather seal being flat, of uniform-thickness, and defining first and second feather seal circumferential sides, at least the first feather seal circumferential side having a convex arced edge, wherein the feather seal is oval or elliptical.

14. The seal as recited in claim 13, wherein the second feather seal circumferential side has a second convex arced edge.

15. The seal as recited in claim 13, wherein the first feather seal circumferential side includes a tab.

16. The seal as recited in claim 13, wherein the feather seal is elongated and defines a feather seal longitudinal axis, and the feather seal is symmetric about the feather seal longitudinal axis.

17. The seal as recited in claim 13, wherein the feather seal excludes any straight edges.

18. The seal as recited in claim 13, wherein the feather seal defines first and second axial ends, and the convex arced edge extends from the first axial end to the second axial end.

* * * * *